United States Patent
Rabello et al.

(10) Patent No.: US 10,698,170 B2
(45) Date of Patent: Jun. 30, 2020

(54) DEVICE FOR DISTRIBUTING TRUNK CABLE TO JUMPER CABLE

(71) Applicant: CommScope Technologies LLC, Hickory, NC (US)

(72) Inventors: Jose A. Rabello, Orland Park, IL (US); Marcus J. Ash, Manhattan, IL (US); Bhavin Kadakia, Plainfield, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/701,854

(22) Filed: Dec. 3, 2019

(65) Prior Publication Data

US 2020/0103607 A1    Apr. 2, 2020

Related U.S. Application Data

(63) Continuation of application No. 15/986,274, filed on May 22, 2018, now Pat. No. 10,502,915.

(Continued)

(51) Int. Cl.
*G02B 6/44*    (2006.01)
*H04Q 1/14*    (2006.01)

(52) U.S. Cl.
CPC ......... *G02B 6/4447* (2013.01); *G02B 6/4452* (2013.01); *G02B 6/4471* (2013.01); *H04Q 1/14* (2013.01); *G02B 6/4457* (2013.01)

(58) Field of Classification Search
CPC .. G02B 6/4447; G02B 6/4448; G02B 6/4452; G02B 6/4457; G02B 6/4471; G02B 6/4478; H01R 27/02; H04Q 1/14

(Continued)

(56) References Cited

U.S. PATENT DOCUMENTS 4,805,979 A    2/1989    Bossard et al.
4,869,566 A    9/1989    Juso et al.
(Continued)

FOREIGN PATENT DOCUMENTS

KR    10-2015-0006712    1/2015
WO    2013/063045    5/2013
(Continued)

OTHER PUBLICATIONS

International Preliminary Report on Patentability corresponding to International Application No. PCT/US2018/035360 dated Jan. 9, 2020.

(Continued)

*Primary Examiner* — Michael P Mooney
(74) *Attorney, Agent, or Firm* — Myers Bigel, P.A.

(57)    ABSTRACT

An enclosure for distributing trunk cable to jumper cables includes: a compartment divider with a main panel, a top wall, a bottom wall, opposed side walls, at least one dividing wall that spans the side walls, and a guide wall that spans the top and bottom walls, the compartment divider including a plurality of compartments, each formed by the main panel, the guide wall, one of the side walls, and at least two of the top wall, the bottom wall, and the at least one dividing wall; and a cover that covers the compartment divider to enclose the compartments. The guide wall is configured to form a convex area and a concave area in each compartment. The enclosure further includes a jumper cable entry aperture in each compartment and a jumper cable exit aperture located on one of the side walls.

17 Claims, 14 Drawing Sheets

Related U.S. Application Data

(60) Provisional application No. 62/589,308, filed on Nov. 21, 2017, provisional application No. 62/526,672, filed on Jun. 29, 2017.

(58) Field of Classification Search
USPC .................................. 385/134–139; 439/527
See application file for complete search history.

(56) References Cited

U.S. PATENT DOCUMENTS

| | | | |
|---|---|---|---|
| 5,202,538 | A | 4/1993 | Skirpan |
| 5,491,766 | A | 2/1996 | Huynh et al. |
| 5,825,961 | A | 10/1998 | Wilkins et al. |
| 5,938,462 | A | 8/1999 | Wilson et al. |
| 6,045,399 | A | 4/2000 | Yu |
| D443,248 | S | 6/2001 | Sakasegawa |
| 6,266,471 | B1 | 7/2001 | Burek et al. |
| 6,314,229 | B1 | 11/2001 | Sasaki et al. |
| 6,340,250 | B1 | 1/2002 | Auclair |
| 6,707,978 | B2 | 3/2004 | Wakileh et al. |
| 6,711,337 | B2 | 3/2004 | Hodge et al. |
| 6,993,237 | B2 | 1/2006 | Cooke et al. |
| 7,136,555 | B2 | 11/2006 | Theuerkorn et al. |
| D538,742 | S | 3/2007 | Pickvet et al. |
| 7,292,763 | B2 | 11/2007 | Smith et al. |
| RE40,358 | E | 6/2008 | Thompson et al. |
| 7,477,824 | B2 | 1/2009 | Reagan et al. |
| 7,489,849 | B2 | 2/2009 | Reagan et al. |
| 7,791,864 | B2 | 9/2010 | Matyas et al. |
| 7,805,044 | B2 | 9/2010 | Reagan et al. |
| 7,837,397 | B2 | 11/2010 | Fingler et al. |
| 7,844,158 | B2 | 11/2010 | Gronvall et al. |
| 7,893,567 | B1 | 2/2011 | Deros et al. |
| 8,275,228 | B2 | 9/2012 | Livingston et al. |
| 8,401,387 | B2 | 3/2013 | Biegert et al. |
| 8,532,490 | B2 | 9/2013 | Smith et al. |
| 8,565,571 | B2 | 10/2013 | Kimbrell et al. |
| 8,777,643 | B2 | 7/2014 | De France |
| 8,792,767 | B2 | 7/2014 | Fabrykowski et al. |
| 8,929,740 | B2 | 1/2015 | Smith et al. |
| 8,961,196 | B2 | 2/2015 | Wu et al. |
| 9,069,151 | B2 | 6/2015 | Conner |
| 9,078,287 | B2 | 7/2015 | Khemakhem et al. |
| 9,106,981 | B2 | 8/2015 | Vastmans et al. |
| 9,535,226 | B2 * | 1/2017 | Simmons ............... H01R 27/02 |
| 9,606,320 | B2 | 3/2017 | Wang |
| 9,742,176 | B2 | 8/2017 | Wang |
| D809,406 | S | 2/2018 | Seo et al. |
| 2005/0163448 | A1 | 7/2005 | Blackwell, Jr. et al. |
| 2005/0175307 | A1 | 8/2005 | Battey et al. |
| 2005/0213921 | A1 | 9/2005 | Smith et al. |
| 2006/0056782 | A1 | 3/2006 | Elkins, II et al. |
| 2006/0093303 | A1 | 5/2006 | Reagan et al. |
| 2006/0153516 | A1 | 7/2006 | Napiorkowski et al. |
| 2009/0134915 | A1 | 5/2009 | Hwang et al. |
| 2009/0226181 | A1 | 9/2009 | Fingler et al. |
| 2010/0142909 | A1 | 6/2010 | Mullaney et al. |
| 2011/0097052 | A1 | 4/2011 | Solheid et al. |
| 2012/0008257 | A1 | 1/2012 | Rebers et al. |
| 2012/0262182 | A1 | 10/2012 | Matsuoka et al. |
| 2012/0295486 | A1 | 11/2012 | Petersen et al. |
| 2013/0084050 | A1 | 4/2013 | Vastmans et al. |
| 2013/0088407 | A1 | 4/2013 | King et al. |
| 2013/0108227 | A1 | 5/2013 | Conner |
| 2013/0146355 | A1 | 6/2013 | Strasser et al. |
| 2014/0140671 | A1 | 5/2014 | Islam |
| 2014/0199079 | A1 | 7/2014 | Smith et al. |
| 2015/0049995 | A1 | 2/2015 | Chen |
| 2015/0219856 | A1 | 8/2015 | Wang |
| 2015/0270637 | A1 | 9/2015 | Islam et al. |
| 2015/0270654 | A1 | 9/2015 | Islam et al. |
| 2015/0378122 | A1 | 12/2015 | Simmons |
| 2016/0103290 | A1 | 4/2016 | Loeffelholz et al. |
| 2016/0266326 | A1 | 9/2016 | Gniadek |
| 2016/0276817 | A1 | 9/2016 | Wang |
| 2017/0141563 | A1 | 5/2017 | Islam et al. |
| 2017/0160489 | A1 | 6/2017 | Wang |

FOREIGN PATENT DOCUMENTS

| | | |
|---|---|---|
| WO | 2013/165831 | 11/2013 |
| WO | 2015/186067 | 12/2015 |

OTHER PUBLICATIONS

International Preliminary Report on Patentability, International Application No. PCT/US2016/068273, dated Jul. 19, 2016, 8 pp.
International Search Report and Written Opinion Corresponding to International Application No. PCT/US2016/068273; dated Feb. 21, 2017; 12 Pages.
International Search Report and Written Opinion for corresponding PCT Application No. PCT/US2015/014347, dated May 15, 2015.
International Search Report and Written Opinion for corresponding PCT Application No. PCT/US2016/022600, dated Jun. 27, 2016.
Notification Concerning Transmittal of International Preliminary Report on Patentability corresponding to International Application No. PCT/US2016/036314, dated Dec. 21, 2017.
Notification Concerning Transmittal of International Preliminary Report on Patentability for corresponding PCT Application No. PCT/US2016/022600 dated Sep. 28, 2017.
Notification of Transmittal of the International Search Report and the Written Opinion of the International Searching Authority, or the Declaration corresponding to International Application No. PCT/US2018/023244 dated Jun. 22, 2018.
Notification of Transmittal of the International Search Report and the Written Opinion of the International Searching Authority, or the Declaration corresponding to International Application No. PCT/US2018/035360 dated Sep. 19, 2018.
Notification of Transmittal of the International Search Report and the Written Opinion of the International Searching Authority, or the Declaration for corresponding PCT Application No. PCT/US2017/052133, dated Jan. 11, 2018.
Notification of Transmittal of the International Search Report and the Written Opinion of the International Searching Authority, or the Declaration, International Application No. PCT/US2016/036314, dated Aug. 30, 2016.
Supplemental European Search Report corresponding to European Application No. 15746886.9, dated Aug. 22, 2017.

* cited by examiner

DEVICE FOR DISTRIBUTING TRUNK CABLE TO JUMPER CABLE

RELATED APPLICATIONS

The present application is a continuation of and claims priority to U.S. patent application Ser. No. 15/986,274, filed May 22, 2018, now U.S. Pat. No. 10,502,915, which claims priority from and the benefit of U.S. Provisional Patent Application Nos. 62/526,672, filed Jun. 29, 2017, and 62/589,308, filed Nov. 21, 2017, the disclosure of each of which is hereby incorporated herein in its entirety.

FIELD OF THE INVENTION

The present invention is directed generally to communications cable and equipment, and more particularly to distribution from a trunk cable to one or more jumper cables.

BACKGROUND

Latest developments in technology for wireless infrastructure use trunk cables that include multiple fiber optic cords or cables. A single trunk cable can be used to service multiple sectors, thereby eliminating multiple runs of cable up an antenna tower. However, in order to use a single trunk cable, at some point the trunk cable must transition to jumper cables to separate the multiple optical fibers of the trunk cable into individual fibers or smaller bundles of fibers that are then routed to different equipment. Typically, this transition occurs inside an enclosure that breaks out the optical fibers in the trunk cable to optical fibers in jumper cables.

Currently, transitions are typically achieved by making connections inside the enclosure, requiring it to be opened, cables to be fed/mated to the enclosure, and fiber connections to be made, all in the field (e.g., on the top of antenna towers near a remote radio unit (RRU)). This practice can create many issues for installers, including time, safety, connection errors (such as loose power connections and/or poor fiber cleaning), and more opportunity for connector damage. Some enclosures are attached to the trunk cable and break out fibers into jumper cables that are also attached to the enclosure. One example of such an enclosure is discussed in U.S. Patent Publication No. 2014/0140671 to Islam, the disclosure of which is hereby incorporated herein in its entirety.

In addition, management of trunk cable and multiple jumper cables can be an issue, as lengths of jumper cables can create a disorganized workspace that can increase mistakes in interconnection. As such, improvements in trunk cable and jumper cable management may be desirable.

SUMMARY

As a first aspect, embodiments of the invention are directed to an enclosure for distributing trunk cable to jumper cables. The enclosure comprises: a first wall with a jumper cable entry aperture; a second wall generally perpendicular to the first wall having a jumper cable exit aperture; and a third wall opposite the second wall, the third wall being configured to create a convex area and a concave area within the enclosure. The jumper cable exit aperture and the concave and convex areas are positioned to encourage coiling of a slack length of a jumper cable routed from the jumper cable entry aperture through the jumper cable exit aperture.

As a second aspect, embodiments of the invention are directed to an enclosure for distributing trunk cable to jumper cables comprising: a compartment divider with a main panel, a top wall, a bottom wall, opposed side walls, at least one dividing wall that spans the side walls, and a guide wall that spans the top and bottom walls. The compartment divider includes a plurality of compartments, each formed by the main panel, the guide wall, one of the side walls, and at least two of the top wall, the bottom wall, and the at least one dividing wall. The enclosure further comprises a cover that covers the compartment divider to enclose the compartments. The guide wall is configured to form a convex area and a concave area in each compartment. The enclosure further comprises a jumper cable entry aperture in each compartment and a jumper cable exit aperture located on one of the side walls.

As a third aspect, embodiments of the invention are directed to an enclosure for distributing trunk cable to jumper cables comprising: a first wall with a jumper cable exit aperture; and a second wall opposite the first wall, the second wall being configured to create a convex area and a concave area within the enclosure, the second wall including a jumper cable entry aperture. The jumper cable exit aperture and the concave and convex areas are positioned to encourage coiling of a slack length of a jumper cable routed from the jumper cable entry aperture through the jumper cable exit aperture.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, cable, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
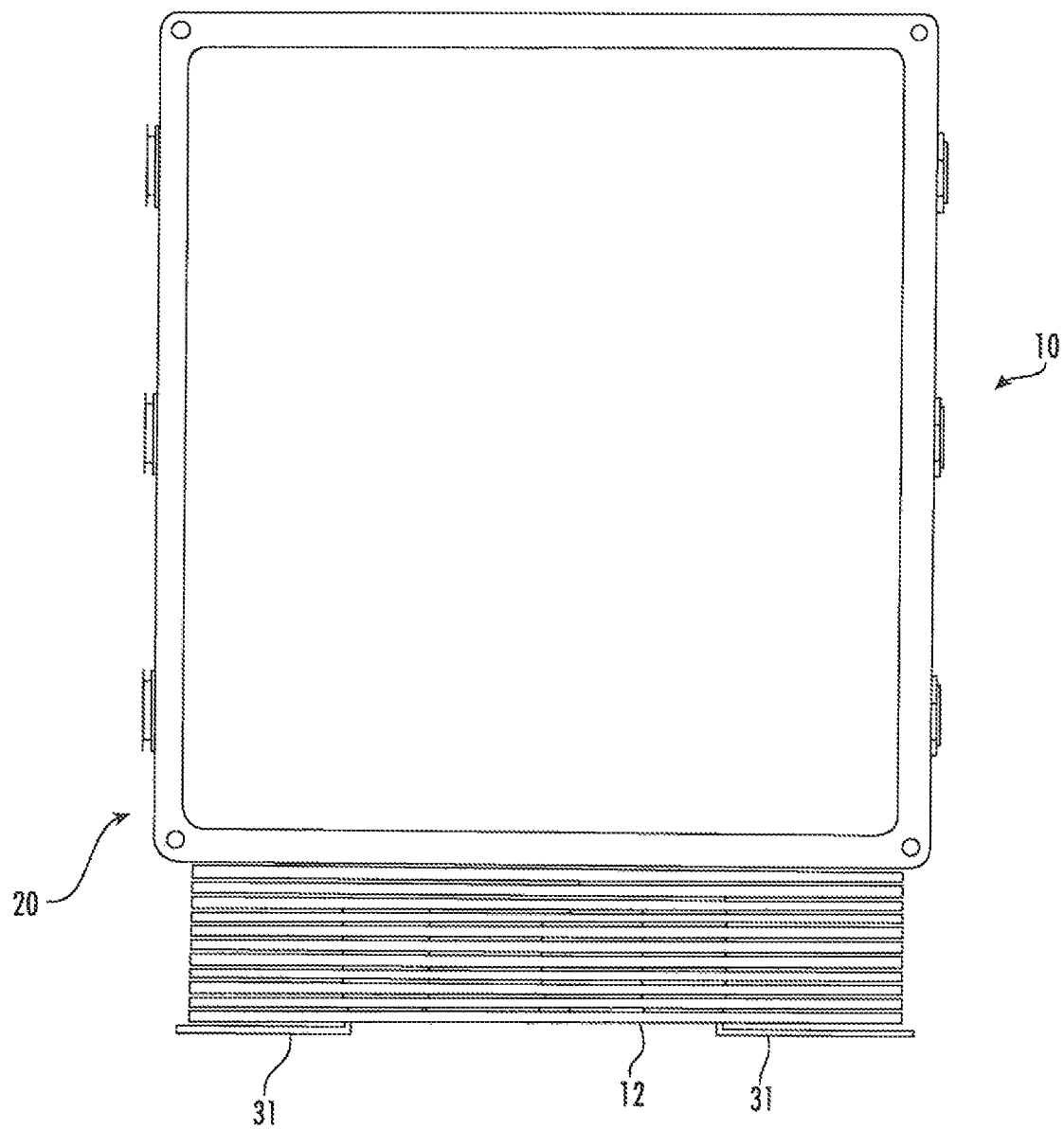
FIG. 1 is a front view of a cable distribution device according to embodiments of the invention.
Figure 2:
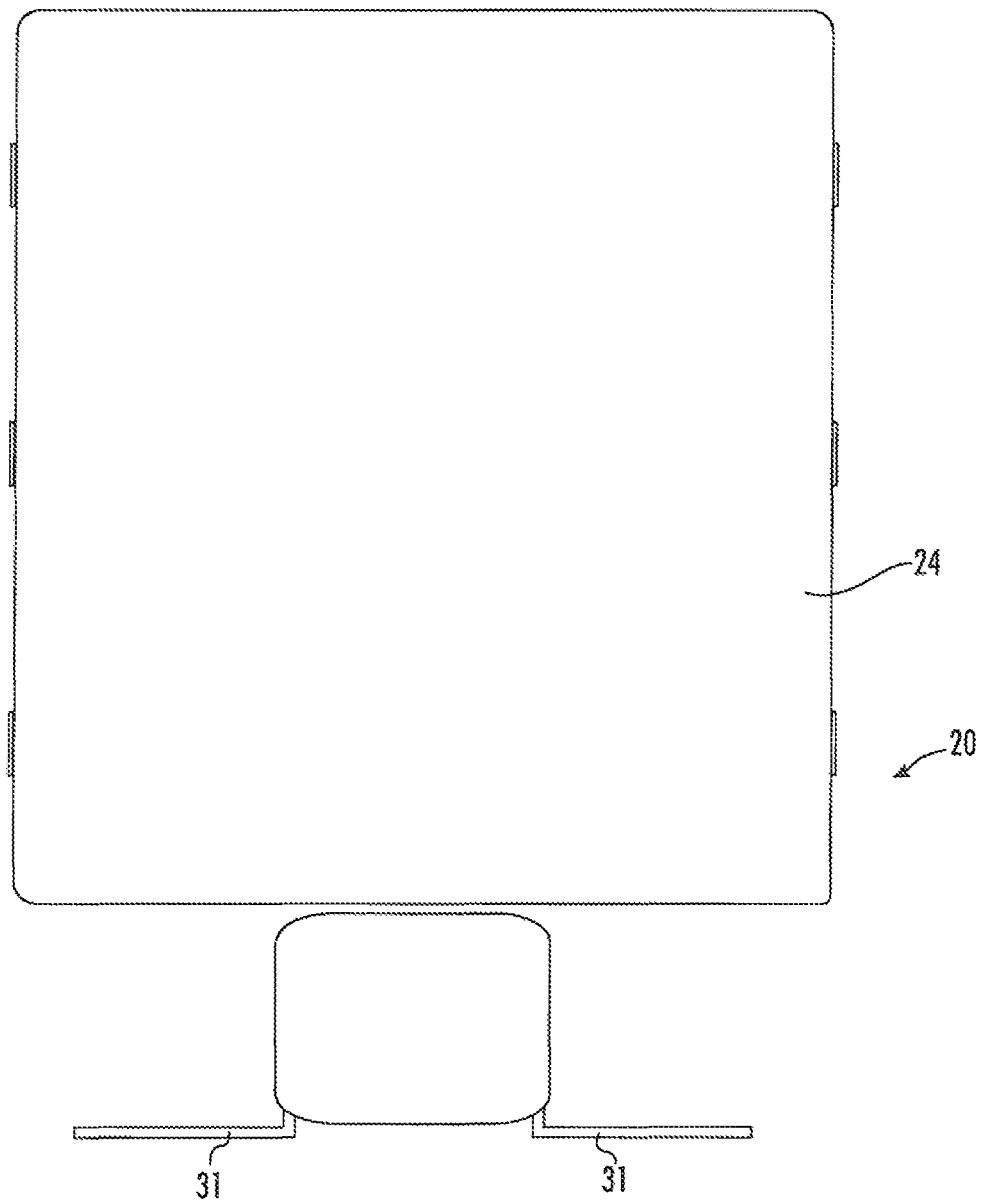
FIG. 2 is a front view of the device of FIG. 1 without the trunk cable in place.
Figure 6:
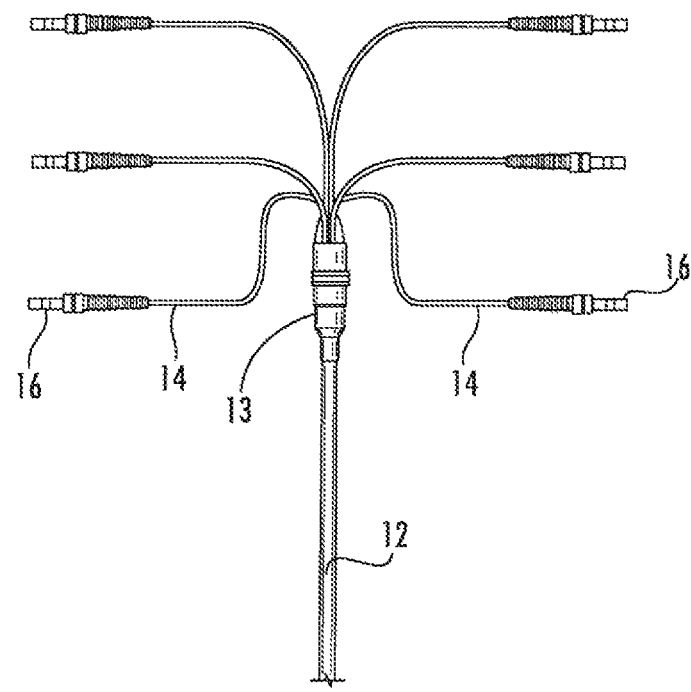
FIG. 6 is a rear view of the trunk cable of the device of FIG. 1, shown with the optical fibers broken out into jumper cables.

Referring now to the figures, an enclosure assembly for managing the distribution of a trunk cable to one or more jumper cables, designated broadly at 10, is shown in FIG. 1. The assembly 10 includes an enclosure 20 that is fed by a trunk cable 12; the trunk cable 12 is broken out into jumper cables 14 with connectors 16 for interfacing with equipment (see FIG. 6). These components are discussed in greater detail below.

Referring to FIGS. 2-5, the enclosure 20 includes a compartment divider 22 and a cover 24 that fit together to form a generally rectangular box, with a main panel 26 of the cover 24 forming the front of the box and a main panel 28 of the compartment divider 22 forming the rear of the box. The cover 24 (FIG. 5) includes a top wall 30, a bottom wall 32, and side walls 34. Each of the side walls 34 includes three holes 35, each of which receives a spider gland 37 (illustrated separately in FIG. 5).

Figure 3:
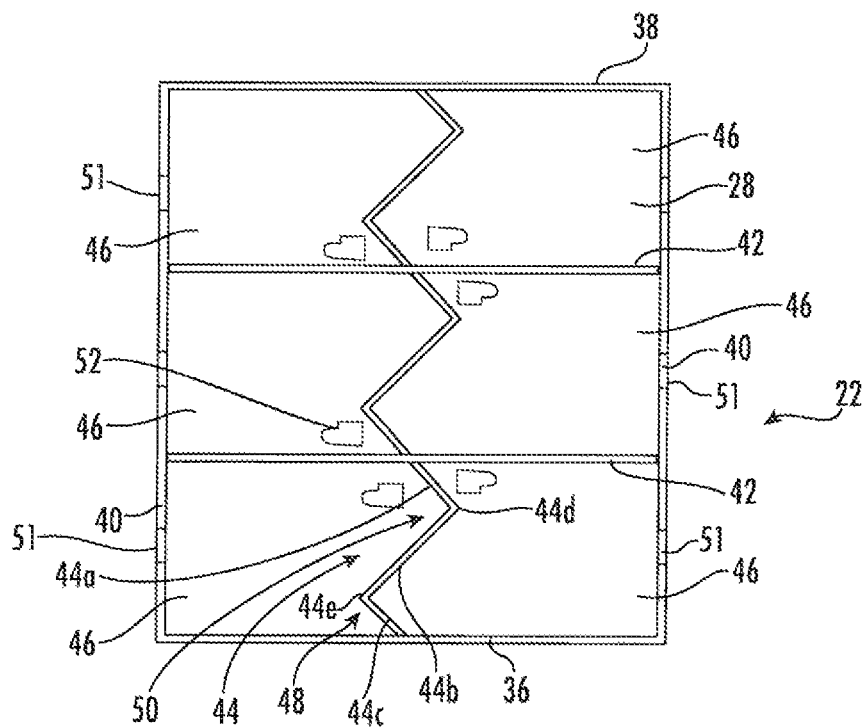
FIG. 3 is a front view of the compartment divider of the device of FIG. 1.
Figure 4:
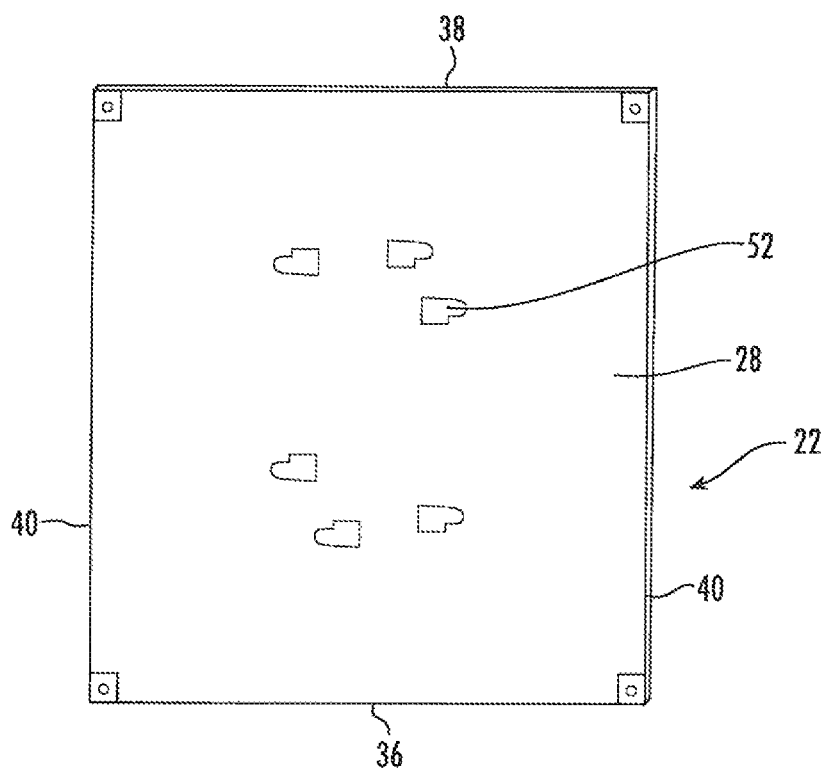
FIG. 4 is a rear view of the compartment divider of FIG. 3.
Figure 5:
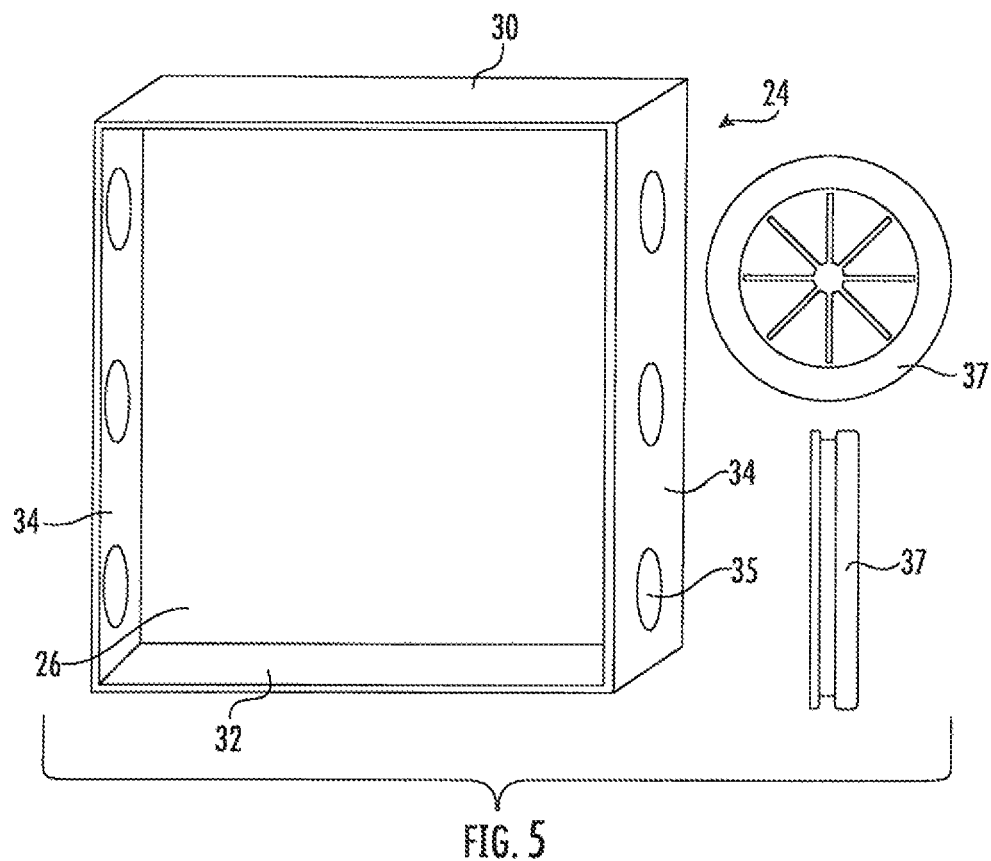
FIG. 5 is a rear perspective view of the cover of the device of FIG. 1.

Referring to FIGS. 3 and 4, the compartment divider 22 includes a bottom wall 36, a top wall 38, and side walls 40 that form an open rectangle with the main panel 28. The side walls 40 each include three holes 51 that serve as jumper cable exit points.

Referring again to FIGS. 3 and 4, the compartment divider 22 also includes two dividing walls 42 that extend horizontally to span the side walls 40. The compartment divider 22 further includes a guide wall 44 that is routed in a "zigzag" pattern from the bottom wall 36 to the top wall 38. The dividing walls 42 and the guide wall 44 subdivide the compartment divider 22 into six compartments 46.

Notably, the "zig-zagging" guide wall 44 is configured such that merging sections 44a, 44b, 44c that separate adjacent compartments 46 are disposed at angles relative to each (e.g., between about 60 and 120 degrees); each set of sections 44a, 44b, 44c has two vertices 44d, 44e, with the result that the sections 44a, 44b, 44c form a "convex" area 48 and a "concave" area 50 in each compartment 46 (see FIGS. 3 and 4). The main panel 28 of the compartment divider 22 includes six "keyhole"-shaped holes 52, one in each compartment 46, that serve as jumper cable entry points. Each of the holes 52 is adjacent one of the dividing walls 42 within either a convex area 48 or a concave area 50. As such, the holes 52 are offset relative to the holes 51 in the side walls 40, as the holes 51 are generally centered between the dividing walls 42 and/or the top or bottom wall 36, 38 that form the top and bottom of the compartment 46.

Figure 7:
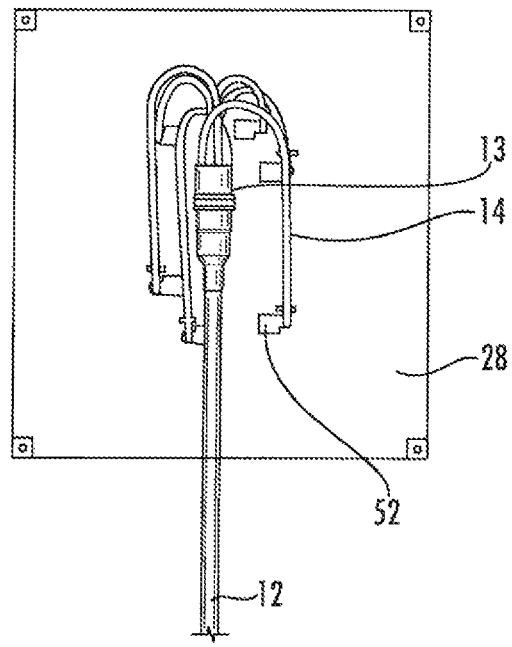
FIG. 7 is a rear view of the trunk cable of FIG. 6 mounted on the rear side of the compartment divider of FIG. 3.

As can be seen in FIGS. 1 and 7, the trunk cable 12 is mounted to the rear side of the main panel 28 of the compartment divider 22, and outside of the box formed by the compartment divider 22 and the cover 24. The trunk cable 12 is routed upwardly from below the enclosure 20. The optical fibers of the cable are split into jumper cables 14 within a protective canister 13 that is mounted generally in the center of the main panel 28. Each jumper cable 14 is routed from the canister 13 through a respective hole 52 and into a respective compartment 46. In some embodiments, the larger portion of the "keyhole" is large enough for the attached connector 16 to pass through, but the smaller portion of the "keyhole" is small enough to prevent passage of the connector 16. This enables the jumper cables 14 to be terminated with connectors 16 prior to being routed into the compartments 46.

Figure 10:
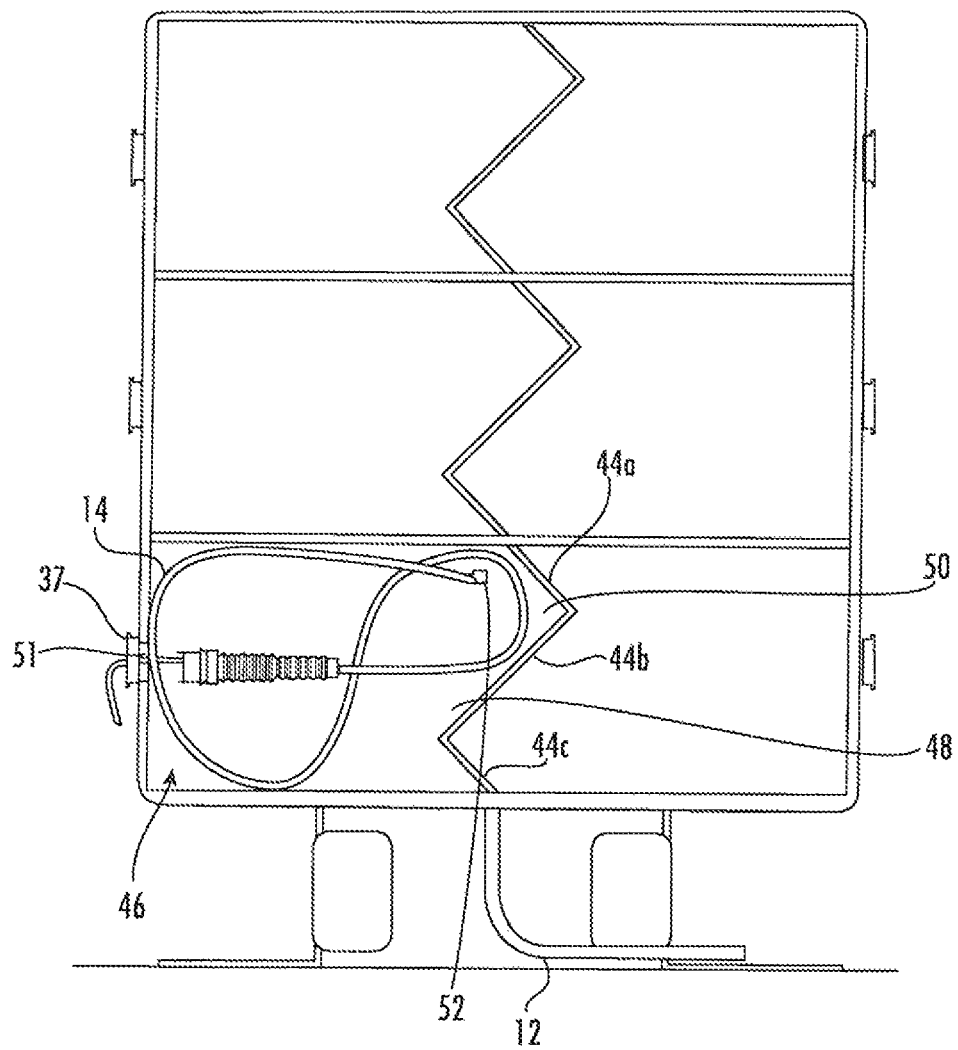
FIG. 10 is a front view of the device of FIG. 1 with the cover removed, showing how a retracted jumper cable coils within a compartment.
Figure 11:
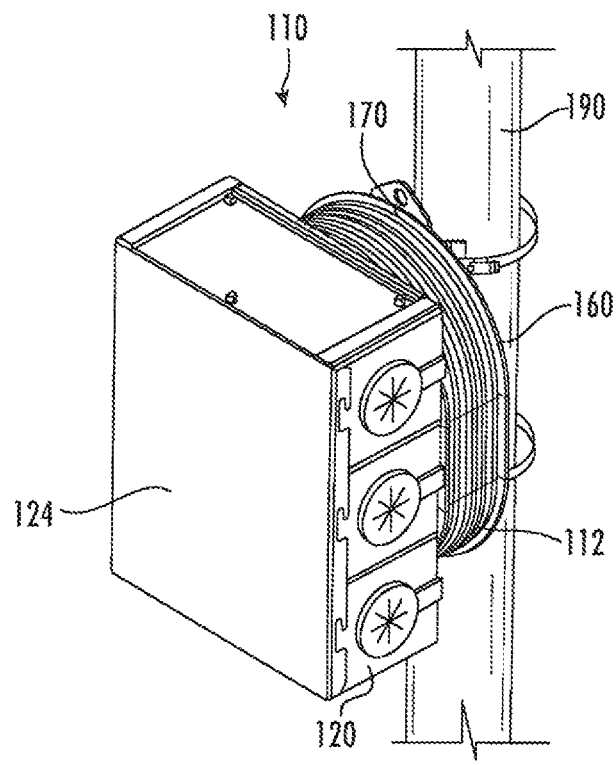
FIG. 11 is a front perspective view of a cable distribution device according to alternative embodiments of the invention.

Referring now to FIG. 10, the jumper cables 14 are routed from their respective holes 52 through holes 41 in the side walls 40 of the compartment divider 22, through the holes 35 in the side walls 34 of the cover 24, and out to connect to equipment. The connectors 16, which may be any variety of optical connector, reside outside of the side walls 40.

The jumper cables 14 are of sufficient length (typically between about 5 and 15 meters) to comfortably reach equipment to which they are connected. However, when the full length of a jumper cable 14 is not needed to reach a piece of equipment, the remainder of the jumper cable 14 can be coiled within its compartment 46. The coiling of the jumper cable 14 may be encouraged by (a) the presence of the convex and concave areas 48, 50 formed by the zigzag routing of the sections 44a, 44b, 44c of the guide wall 44, (b) the offset positions of the vertices 44d, 44e relative to the holes 51 in the side wall 40, and/or (c) the offset position of the holes 52 through which the jumper cables 14 are routed relative to the holes 51 in the side walls 40. These offsets can induce coiling of the jumper cables 14 between opposite corners of the compartment 46 (see FIG. 10). With some resistance provided by the spider glands 37, the jumper cables 14 remain coiled (and therefore relatively organized), and can be uncoiled through the holes 51, 52 as length of jumper cable 14 is needed.

Figures 8, 9:
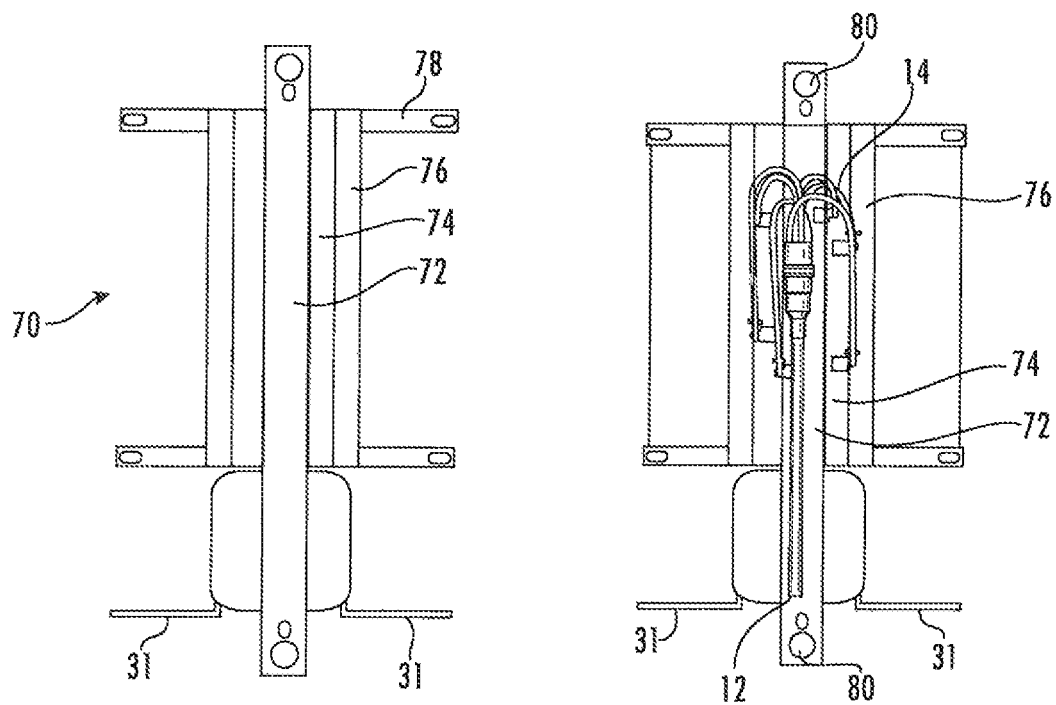
FIG. 8 is a rear view of a mounting bracket for the device of FIG. 1.
FIG. 9 is a rear view of the mounting bracket of FIG. 8 mounted to the compartment divider of FIG. 3.

Referring now to FIGS. 8 and 9, in the illustrated embodiment the device 10 includes a mounting bracket 70. The mounting bracket 70 includes a central channel 72, shallower lateral channels 74, and outer panels 76. Four wings 78 extend laterally of the outer panels 76. As shown in FIG. 9, the mounting bracket 70 is attached to the rear side of the main panel 28 of the compartment divider 24, with fasteners (not shown) being inserted through holes in the wings 78 and into holes in the main panel 28. The trunk cable 12 and canister 13 reside in the central channel 72, and the jumper cables 14 reside in the lateral channels 74 as they are routed to the holes 52 in the main panel 28. The outer panels 76 lay flush against the main panel 28. Thus, the mounting bracket 70 can serve to protect the trunk cable 12 and jumper cables 14 from severe environmental conditions. Two wings 31 extend from the central channel 72 and provide a location for coiling a slack length of the trunk cable 12, which may be as much as 100 meters or more (see FIGS. 1 and 2).

The central channel 72 of the mounting bracket 70 includes holes 80 at each end that can be used to mount the mounting bracket 70 and device 10 to a mounting structure.

The enclosure 20 may be formed of a variety of suitable materials, such as metallic and polymeric materials. A typical material for the enclosure 20 is polycarbonate, which may be US-stabilized. The mounting bracket 70 is typically formed of a metallic material such as steel.

Those having skill in this art will appreciate that the assembly 10 may take other forms. For instance, the guide wall 44 may be configured such that convex and concave areas of the compartments are created by non-rectilinear segments of the guide wall 44; as one example, the guide wall 44 may be sinusoidal or scalloped, rather than defining a zig-zag pattern with distinct vertices. As another example, the guide wall may be configured such that compartments 46 that share a portion of the guide wall 44 have adjacent convex areas and adjacent concave areas on opposite sides of the guide wall 44, rather than having the convex area of one compartment be adjacent to the concave area on the opposite side of the guide wall 44. As a further example, the guide walls 44 and holes 52, 41 that serve as entry and exit points for the jumper cables 14 may located such that some of the jumper cables 14 exit the top and bottom walls of the device 10 rather than the side walls. Other variations may also be employed.

In addition, although the assembly 10 is illustrated with six compartments 46, an assembly 10 may have fewer compartments (as few as one), or more compartments as needed. Similarly, a trunk cable 12 having more or fewer jumper cables 14 broken out from it may also be employed. It should also be noted that the trunk cable 12 and jumper cables 14 may comprise electrical cables or hybrid fiber/electrical cables.

To provide a sense of scale, one exemplary assembly 10 includes a 40 meter, 7 mm optical fiber trunk cable 12 with six 10-meter, 5-mm jumper cables 14. The jumper cables 14 are coiled within six compartments bounded by top, bottom and side walls defining a rectangular space 15 inches tall, 12 inches wide, and 8 inches deep.

An alternative embodiment of an enclosure assembly is illustrated in FIGS. 11-19 and designated broadly at 110. The assembly 110 includes a trunk cable 112 that is broken out into six jumper cables 112 as discussed above. However, the assembly 110 includes an enclosure 120 that differs from the enclosure 20 in multiple ways, some of which are discussed below.

Figure 15:
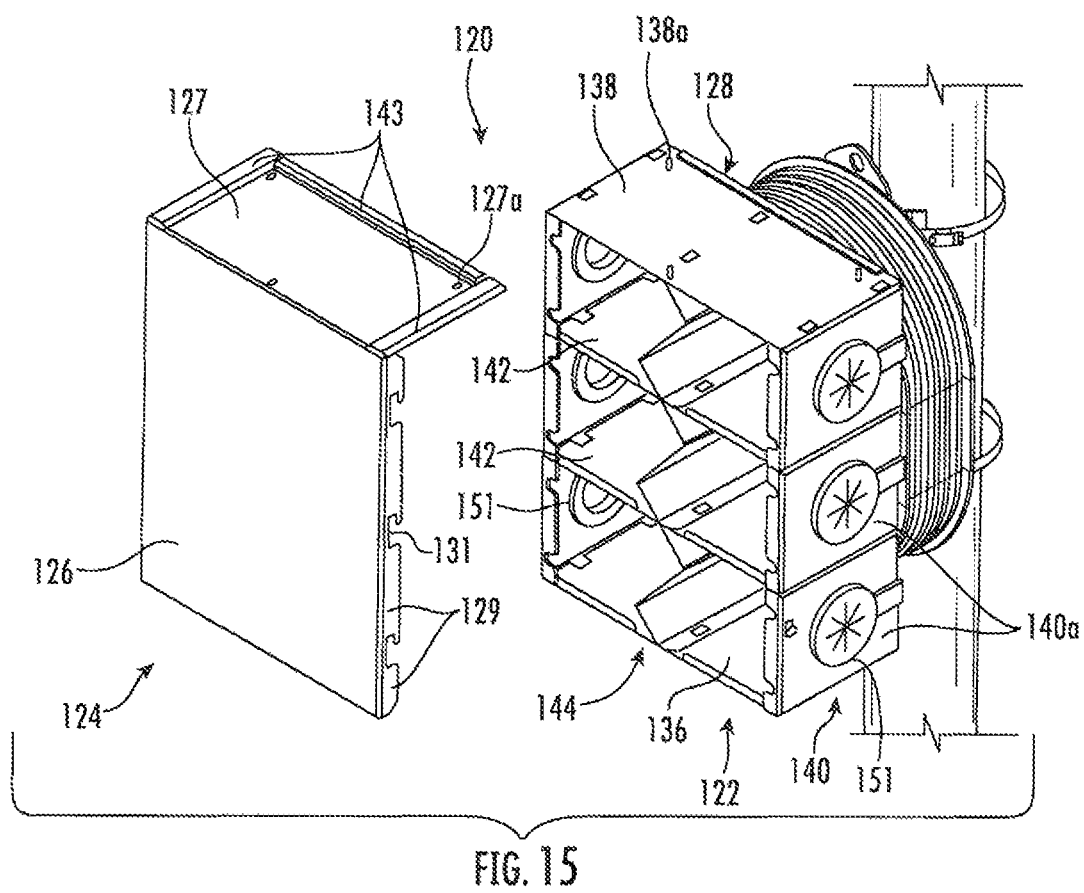
FIG. 15 is an exploded front view of the device of FIG. 11.

Referring to FIG. 15, the enclosure 120 includes a compartment divider 122 and a cover 124 that fit together to form a generally rectangular box, with a main panel 126 of the cover 124 forming the front of the box and a main panel 128 of the compartment divider 122 forming the rear of the box. The compartment divider 122 includes a bottom wall 136, a top wall 138, and side walls 140 that form an open rectangle with the main panel 128. The side walls 140 each include three holes with spider glands 151 that serve as jumper cable exit points. Also, like the enclosure 20, the compartment divider 122 also includes two dividing walls 142 that extend horizontally to span the side walls 140 and a guide wall 144 that is routed in a "zigzag" pattern from the bottom wall 136 to the top wall 138. The dividing walls 142 and the guide wall 144 subdivide the compartment divider 122 into six compartments 146.

However, unlike the compartment divider 22, the compartment divider 122 is in a modular form. Each of the side walls 140 is formed by three panels 140a. Similarly, the guide wall 144 is formed by three bi-angled sections 144a that form convex and concave areas in the manner described above. A dividing wall 142 is positioned between each adjacent pair of panels 140a and between each adjacent pair of bi-angled sections 144a. The top wall 138 and bottom wall 136 are also separate panels that are attached, respectively, to the upper ends of the uppermost panels 140a and the lowermost ends of the lowermost panels 140a. The various components are attached to each other via tabs and slots, but may be attached in other ways familiar to those of skill in this art.

The modular form described above can enable simple construction of the assembly 110 with different numbers of compartments 146. As an example, if a trunk cable 112 with eight jumper cables 114 is employed, the compartment divider 122 would include four panels 140a on each side rather than three and three dividing walls 142 rather than two. In this fashion, the assembly 110 may be modified to include any desired number of compartments 146. It is also contemplated that, as illustrated herein, the top wall 138 and bottom wall 136 may have the same configuration as the dividing walls 142.

Figure 16:
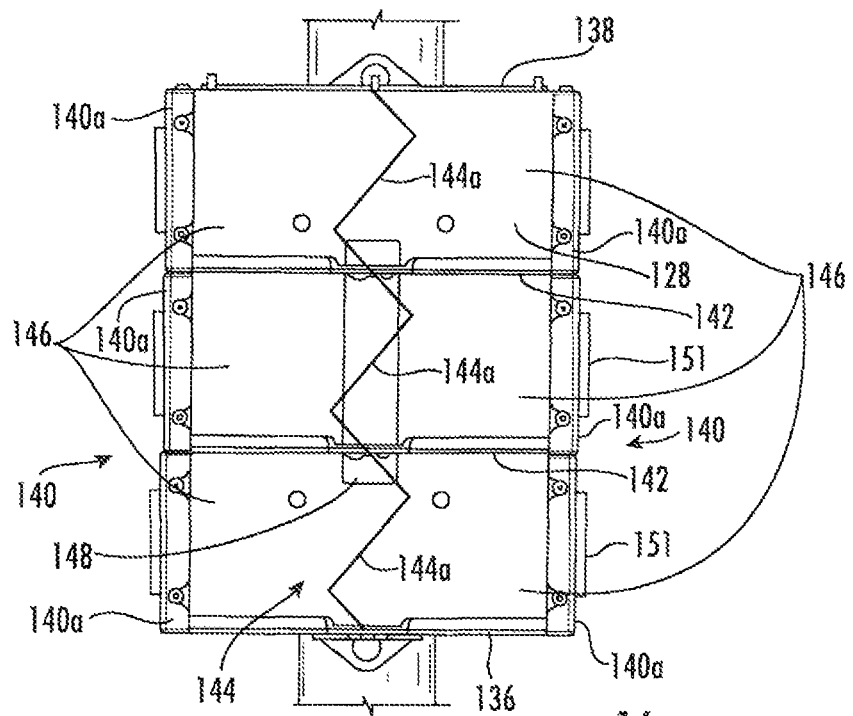
FIG. 16 is a front view of the compartment divider of the device of FIG. 11.
Figure 17:
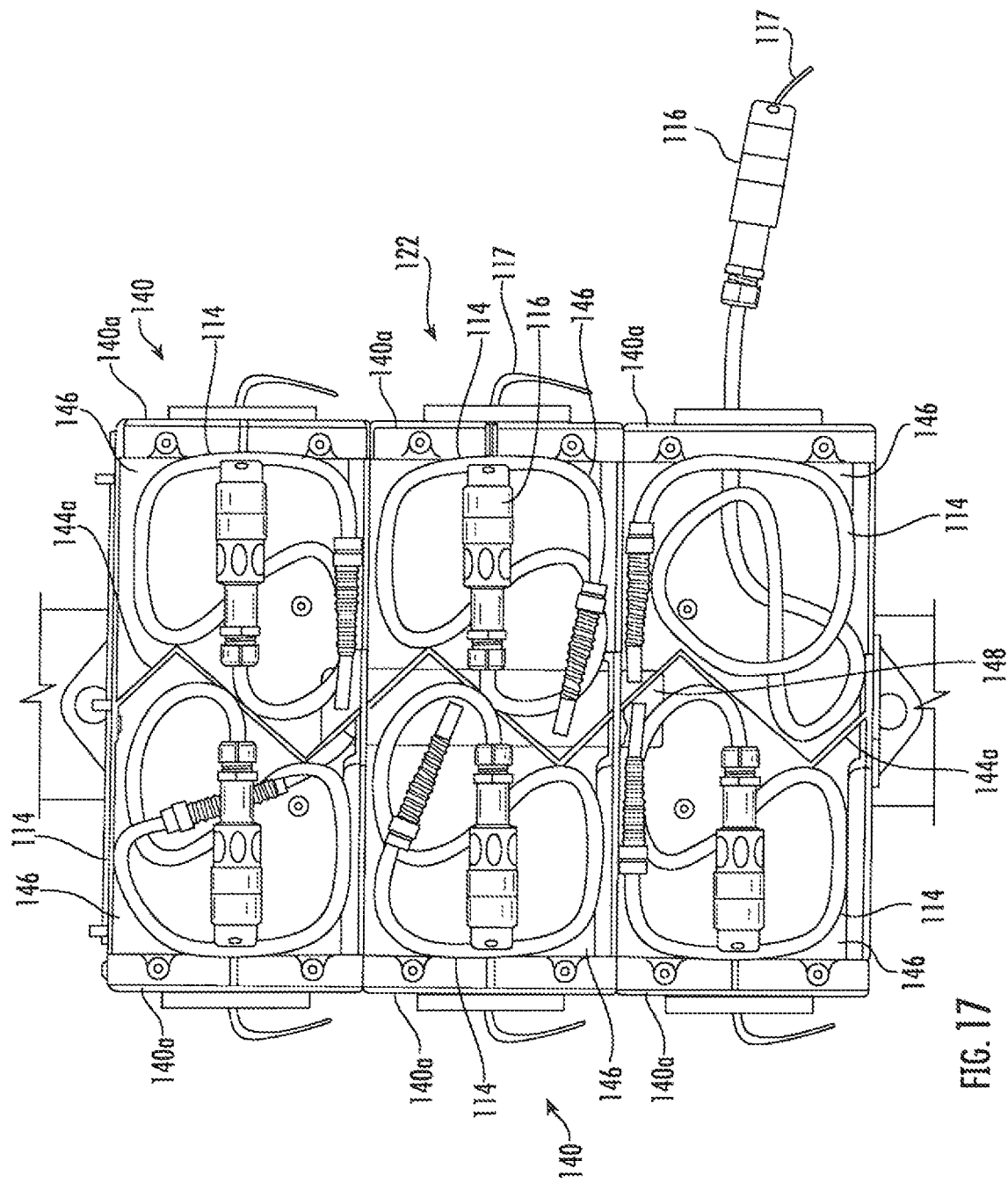
FIG. 17 is a front view of the compartment divider of the device of FIG. 11 populated with jumper cables.

Referring to FIGS. 16 and 17, it should also be noted that the main panel 128 of the compartment divider 122 includes a central slot 148 through which the jumper cables 114 are routed into their respective compartments 146. Because the guide wall 144 (comprising its three separate bi-angled sections 144a) and the dividing walls 142 are separate components from the main panel 128, the jumper cables 114 can be routed from the rear side of the main panel 128 (where they are broken out, as discussed below) through the slot 148, then easily separated and directed to their respective compartments 146 prior to the installation of the dividing walls 142 and the bi-angled sections 144a. The slot 148 is sufficiently large to enable the jumper cables 114 to be terminated with connectors 116 prior to their routing to the compartments 146. Once routed into the compartments 146, the jumper cables 114 can be coiled and extended in the manner described above. FIG. 17 also illustrates pull strings 117 that may be attached to the connectors 116 to assist with extension of the connectors 116 and jumper cables 114 through the spider glands 151.

Referring to FIGS. 15 and 16, the cover 124 includes the main panel 126, a top panel 127, and side flanges 129. The side flanges 129 include recesses 131 that engage tabs on the panels 140a. Raised channels 143 are present along three side edges of the top panel 127 to fit over tabs on the uppermost panels 140a and the upper edge of the main panel 128 of the compartment divider 122. Holes 127a in the top panel 127 receive pins 138a extending upwardly from the top wall 138.

Figure 18:
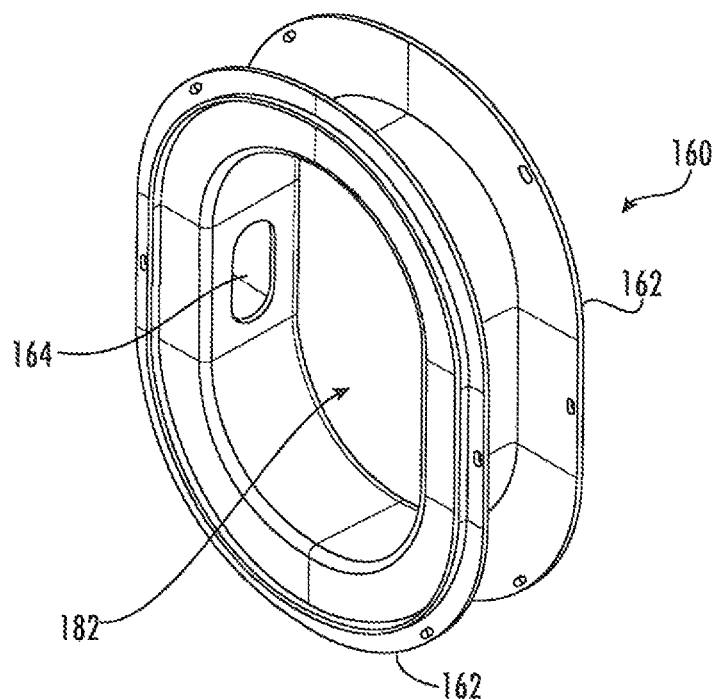
FIG. 18 is a front perspective view of the cable reel of the device of FIG. 11.

Referring now to FIG. 18, the assembly 110 includes a cable reel 160. The cable reel 160 is generally oval in shape and includes overhanging flanges 162 to assist in maintaining coiled trunk cable 112 in place. An access hole 164 in the reel 160 provides a passage from the exterior of the reel 160 to its interior. Thus, the trunk cable 112 can be routed up an antenna tower to the cable reel 160, coiled around the reel 160 (see FIG. 11), and routed through the access hole 164 into the interior of the reel 160. From there, the trunk cable 112 is broken out into the jumper cables 114, which are then routed through the slot 148 into the compartments 146 of the compartment divider 122.

Figure 12:
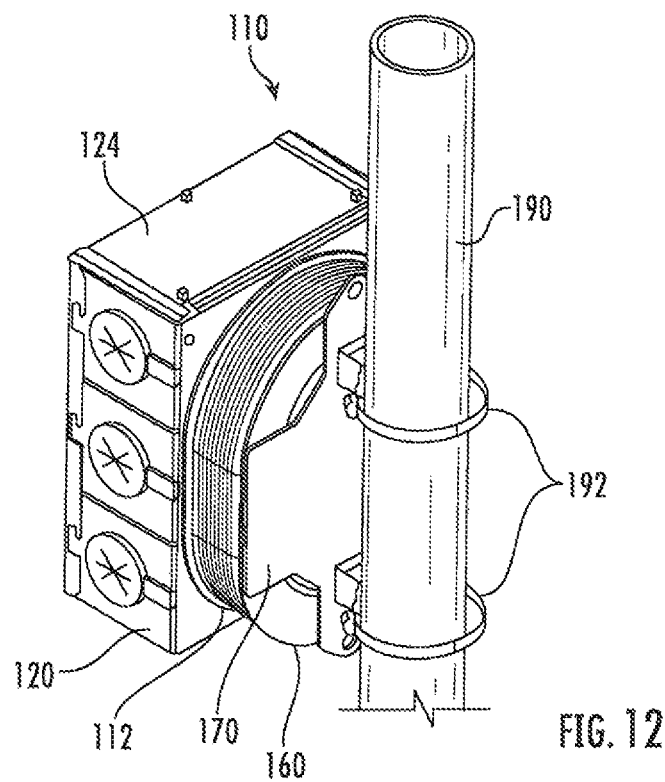
FIG. 12 is rear perspective view of the device of FIG. 11.
Figure 13:
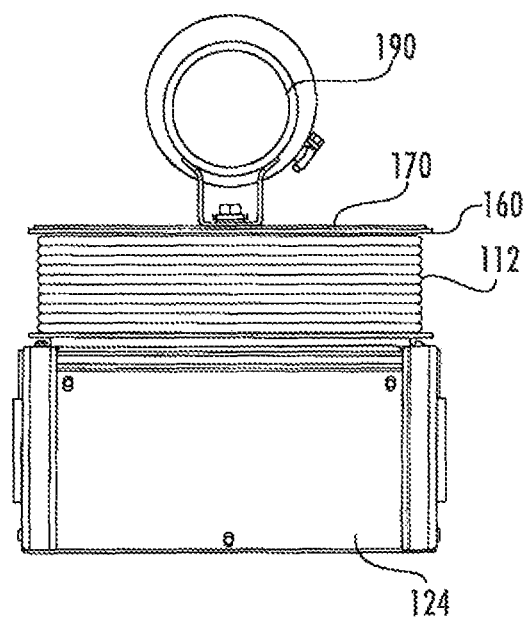
FIG. 13 is a top view of the device of FIG. 11.
Figure 14:
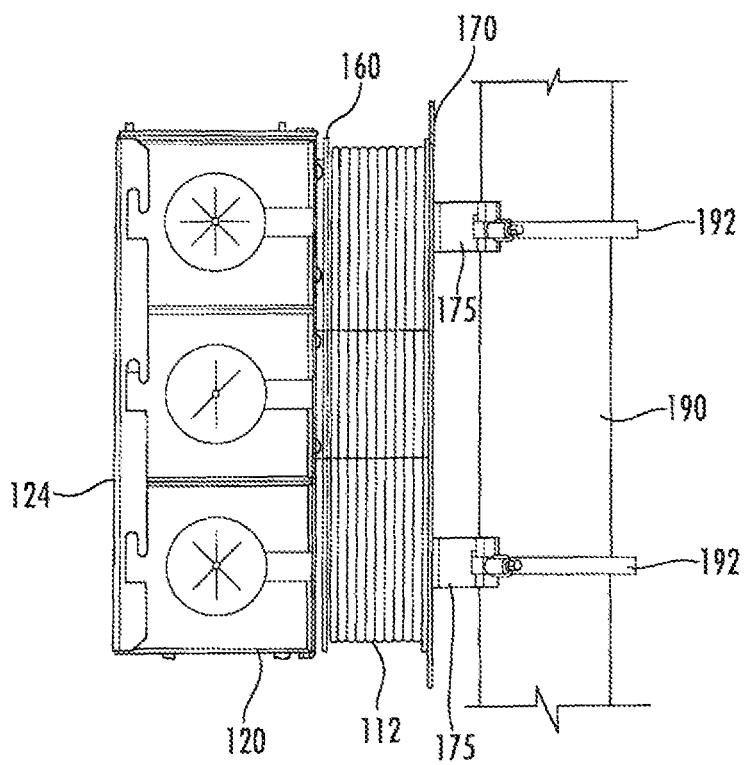
FIG. 14 is a side view of the device FIG. 11.
Figure 19:
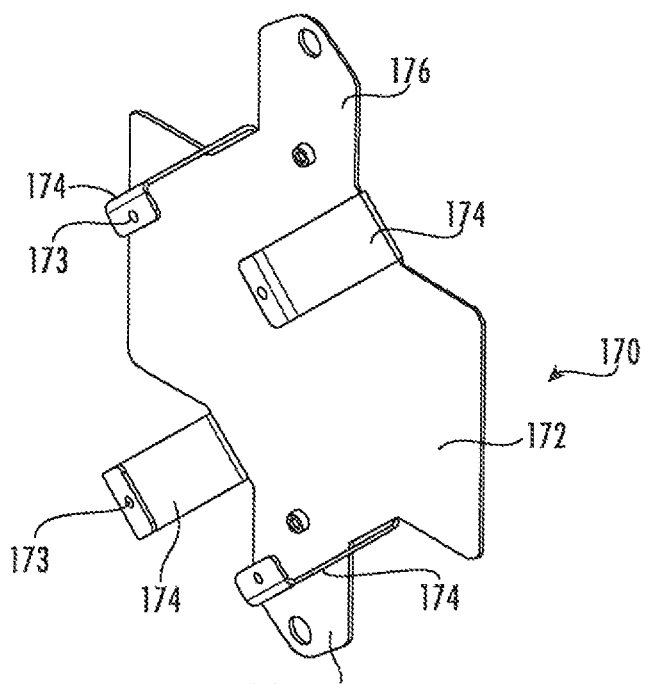
FIG. 19 is a front perspective view of the back mount used to mount the device of FIG. 11.

Referring now to FIGS. 12 and 19, the assembly 110 can be mounted to a mounting structure, such as an antenna tower 190, via a mounting bracket 170. The mounting bracket 170 includes a main plate 172, four flanges 174 that extend forwardly normal to the main plate 172, and two mounting tabs 176 that are coplanar with the main plate 172. Two hose clamp brackets 175 are mounted to the main plate 172 and extend rearwardly therefrom (see FIG. 14).

The enclosure 120 is mounted to the mounting bracket 170 via screws or outer fasteners inserted into holes 173 in the flanges 174 and holes 141 in the panels 140. The flanges 174 reside within the interior of the reel 160. The mounting bracket 170 is attached to the mounting structure 190 via hose clamps 192 inserted into the hose clamp brackets 175 that encircle the mounting structure 190.

In this configuration, the main plate 172 of the mounting bracket 170, the main panel 128 of the enclosure 120, and the cable reel 160 forms a cavity 182. The cavity 182 can provide a protective space within which the jumper cables 114 can be broken out of the trunk cable 112.

Figure 20:
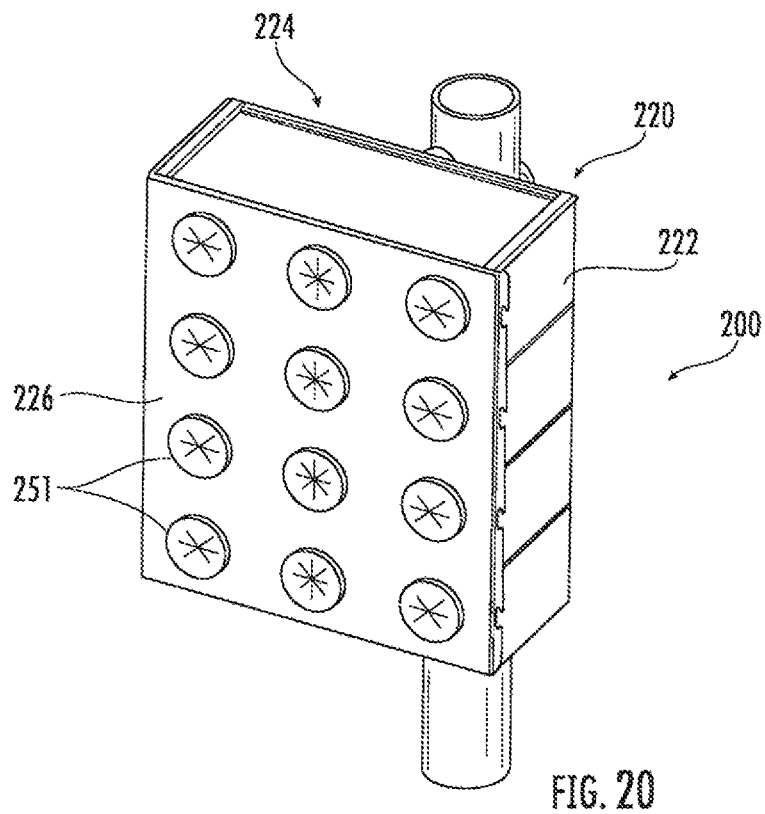
FIG. 20 is a front perspective view of a cable distribution device according to further embodiments of the invention.
Figure 21:
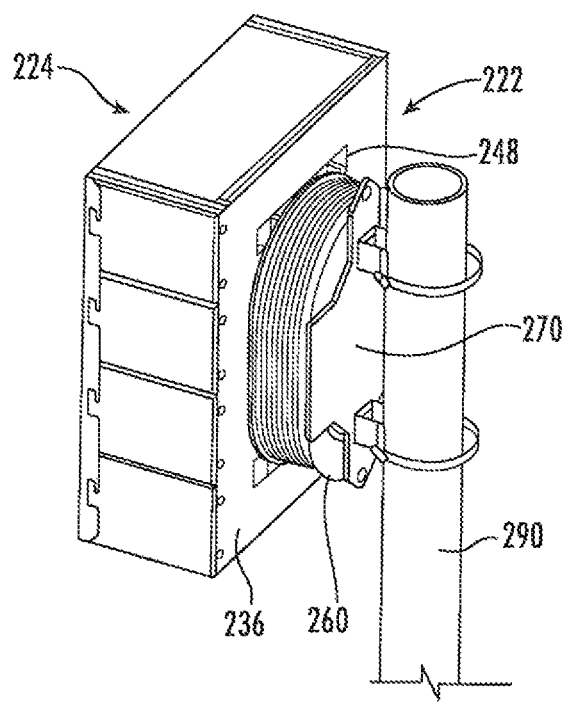
FIG. 21 is a rear perspective view of the device of FIG. 20.
Figure 22:
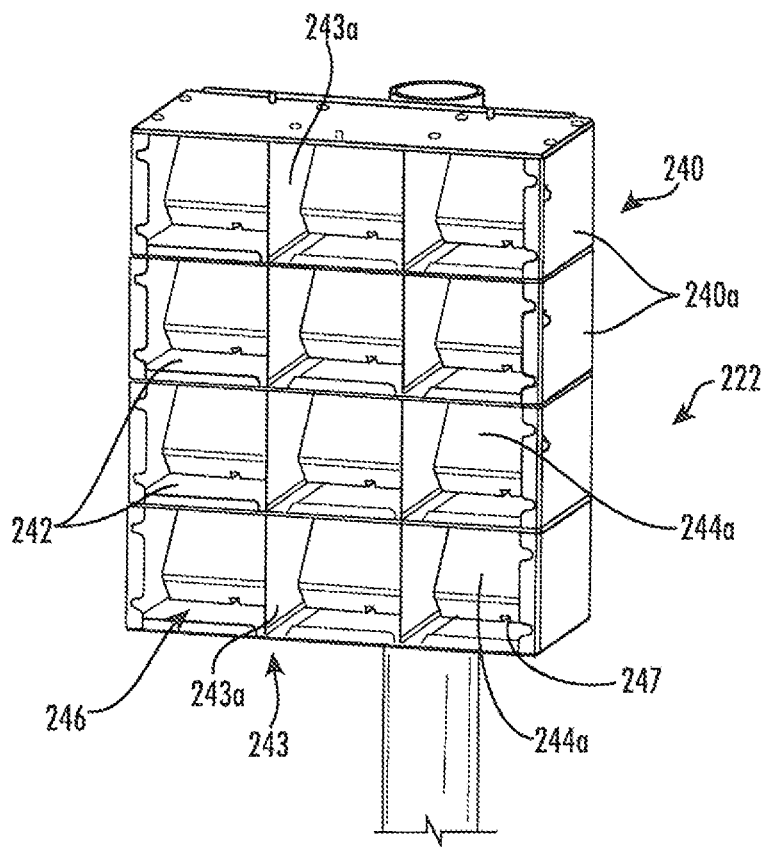
FIG. 22 is a front perspective view of the device of FIG. 20 with the cover removed.

Referring now to FIGS. 20-22, another cable distribution device, designated broadly at 200, is shown therein. The device 200 is designed so that jumper cables exit the front, rather than the sides, of the enclosure 220. The device 200 is described in greater detail below.

The compartment divider 222 of the enclosure 220 is similar in construction to the compartment divider 122 in that it has a main panel 228, side walls 240 made up of separate panels 240a, and horizontal dividing walls 242. However, the compartment divider 222 also includes vertical dividing walls 243 that intersect the horizontal dividing walls 242 to form compartments 246 (in this embodiment, twelve compartments 246 are present). The vertical dividing walls 243 are formed of individual panels 243a. The rear portion of each compartment 246 is formed by a bi-angled section 244a similar to the sections 144a described above for the compartment divider 122. Each bi-angled section 244a is positioned forwardly of the main panel 228. Each of the sections 244a includes a small hole 247 in its lower edge to provide access for a jumper cable.

The enclosure 220 also includes a cover 224 similar in configuration to the cover 124 described above, with the exception that the main panel 226 includes a plurality of spider glands 251 mounted therein. Each of the spider glands 251 is positioned directly in front of a respective compartment 246.

Referring to FIG. 21, the main panel 236 of the compartment divider 222 includes four horizontal slots 248 (two of which are visible in FIG. 21) that each span three compartments 246. The slots 248 provide access into the compartments 246 for jumper cables exiting the interior cavity of the reel 260. A mounting bracket 270 similar to that described above is employed to mount the reel 260 and enclosure 220 to a mounting structure 290.

As can be envisioned from FIGS. 20-22, assembly of the device 200 can be relatively simple. Jumper cables can be routed from the cable reel 260 into the compartments 246 through the slots 248 in the main panel 236 prior to the installation of the horizontal and vertical dividing walls 242, 243 and the bi-angled sections 244a. Thus, this routing can be performed with the jumper cables already terminated with a connector. Once the jumper cables are routed through the slots 248, the horizontal and vertical dividing walls 242, 243 can be installed to form the compartments 246, and the bi-angled sections 244a can be positioned at the rear of the compartments 246 with the jumper cables extending through the holes 247. The hi-angled sections 244a define convex and concave areas in each compartment 246 (like those discussed previously) that encourage coiling of stored jumper cables.

Figure 23:
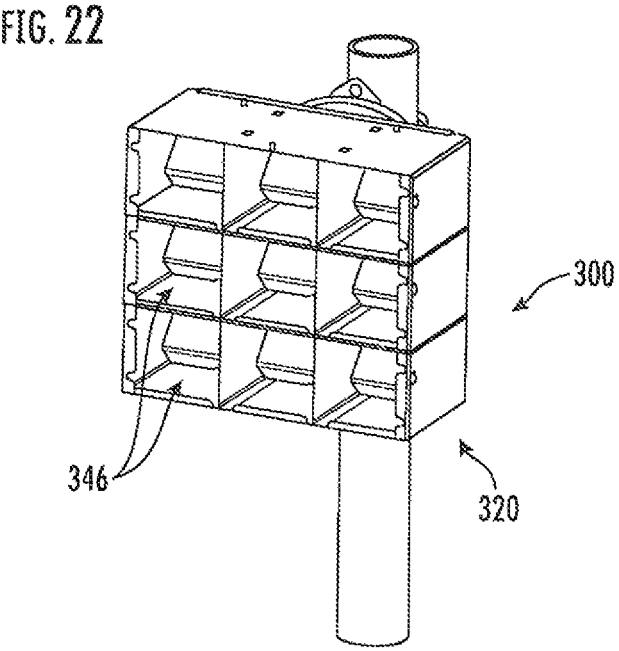
FIGS. 23-25 are front perspective views of a device as in FIG. 20 with nine, six and three compartments respectively.
Figure 24:
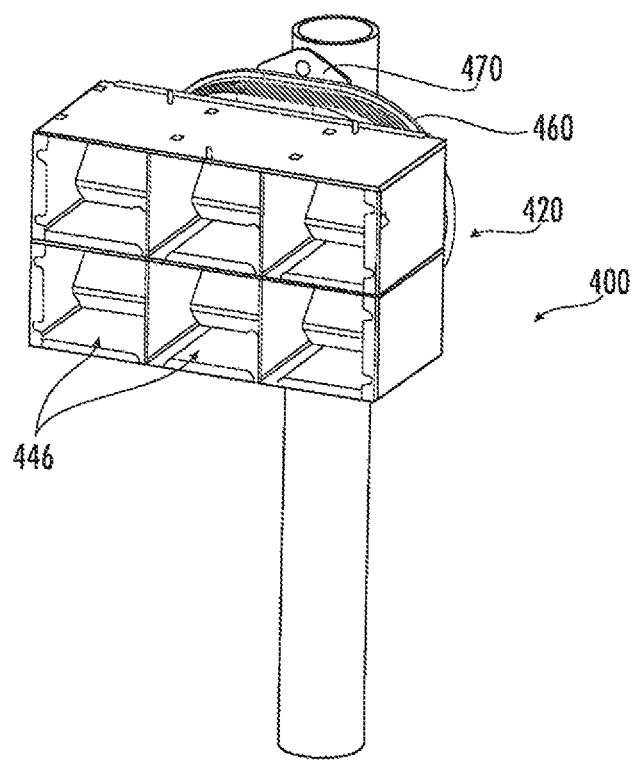
Figure 25:
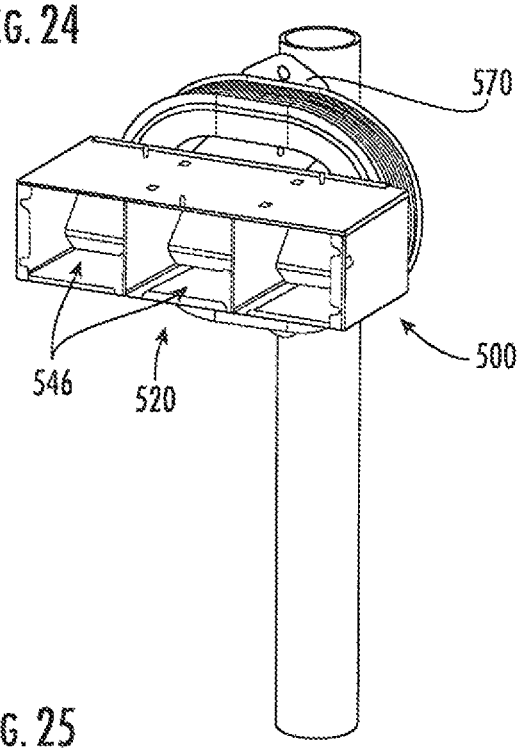

Additional variations of the device 200 can be seen in FIGS. 23-25. FIG. 23 illustrates a device 300 that includes an enclosure 320 with nine compartments 346 rather than twelve. FIG. 24 illustrates a device 400 with an enclosure 420 with six compartments 446. Notably, the device 400 has a mounting bracket 470 that is slightly different in size and configuration to accommodate the horizontal (rather than vertical) orientation of the reel 460. FIG. 25 illustrates a device 500 with an enclosure 520 with three compartments 546; this device is also mounted with a horizontal-style bracket 570 like the bracket 470 described above.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An enclosure for distributing trunk cable to jumper cables, comprising:
   a compartment divider with a main panel, a top wall, a bottom wall, opposed side walls, at least one dividing wall that spans the side walls, and a guide wall that spans the top and bottom walls, the compartment divider including a plurality of compartments, each formed by the main panel, the guide wall, one of the side walls, and at least two of the top wall, the bottom wall, and the at least one dividing wall; and
   a cover that covers the compartment divider to enclose the compartments;
   wherein the guide wall is configured to form a convex area and a concave area in each compartment;
   the enclosure further comprising a common slot in the main panel that serves as a jumper cable entry aperture into each compartment, and wherein each compartment includes a jumper cable exit aperture located on one of the side walls.

2. The enclosure defined in claim 1, wherein the jumper cable exit aperture and the concave and convex areas are positioned to encourage coiling of a slack length of a jumper cable routed from the jumper cable entry aperture through the jumper cable exit aperture.

3. The enclosure defined in claim 1, wherein the guide wall includes first, second and third serially merging sections angularly disposed relative to each other, with the first and second sections forming the convex area of a first compartment and the concave area of a second compartment, and with the second and third sections forming the concave area of the first compartment and the concave area of the second compartment.

4. The enclosure defined in claim 1, wherein the jumper cable entry aperture is positioned in the concave area of at least some of the compartments.

5. The enclosure defined in claim 3, wherein the angle between the first and second sections is between about 60 and 120 degrees.

6. The enclosure defined in claim 1, wherein the jumper cable exit aperture in each compartment is offset from the jumper cable entry aperture.

7. The enclosure defined in claim 3, wherein the first and second sections meet at a first vertex, and the second and third sections meet at a second vertex, and the first and second vertices are offset from the jumper cable exit aperture.

8. The enclosure defined in claim 1, in combination with a trunk cable distributed into a plurality of jumper cables, and wherein one of the jumper cables is routed into each compartment through a respective jumper cable entry aperture and out of the compartment through a respective jumper cable exit aperture.

9. The enclosure defined in claim 8, further comprising a mounting bracket mounted to the main panel of the compartment divider, the mounting bracket configured to cover portions of the trunk cable and portions of the jumper cables routed to the jumper cable entry apertures.

10. The enclosure defined in claim 1, wherein the side walls comprise a plurality of panels divided by the dividing wall, and wherein the guide wall comprises plurality of bi-angled sections divided by the dividing wall.

11. An enclosure for distributing trunk cable to jumper cables, comprising:
a compartment divider with a main panel, a top wall, a bottom wall, opposed side walls, at least one dividing wall that spans the side walls, and a guide wall that spans the top and bottom walls, the compartment divider including a plurality of compartments, each formed by the main panel, the guide wall, one of the side walls, and at least two of the top wall, the bottom wall, and the at least one dividing wall; and
a cover that covers the compartment divider to enclose the compartments;
wherein the guide wall is configured to form a convex area and a concave area in each compartment;
each compartment having a jumper cable entry aperture in the main panel and a jumper cable exit aperture located on one of the side walls;
the enclosure further comprising a cable reel mounted to the main panel and a trunk cable distributed into a plurality of jumper cables, wherein the trunk cable is wound onto the cable reel, and wherein one of the jumper cables is routed into each compartment through a respective jumper cable entry aperture and out of the compartment through a respective jumper cable exit aperture.

12. The enclosure defined in claim 11, wherein the jumper cable exit aperture and the concave and convex areas are positioned to encourage coiling of a slack length of a jumper cable routed from the jumper cable entry aperture through the jumper cable exit aperture.

13. The enclosure defined in claim 11, wherein the guide wall includes first, second and third serially merging sections angularly disposed relative to each other, with the first and second sections forming the convex area of a first compartment and the concave area of a second compartment, and with the second and third sections forming the concave area of the first compartment and the concave area of the second compartment.

14. The enclosure defined in claim 11, wherein the jumper cable entry aperture is positioned in the concave area of at least some of the compartments.

15. The enclosure defined in claim 13, wherein the angle between the first and second sections is between about 60 and 120 degrees.

16. The enclosure defined in claim 11, wherein the jumper cable exit aperture in each compartment is offset from the jumper cable entry aperture.

17. The enclosure defined in claim 13, wherein the first and second sections meet at a first vertex, and the second and third sections meet at a second vertex, and the first and second vertices are offset from the jumper cable exit aperture.

* * * * *